United States Patent [19]

Voorman

[11] Patent Number: 5,469,475
[45] Date of Patent: Nov. 21, 1995

[54] TRANSMITTER COMPRISING AN ELETRONIC ARRANGEMENT FOR GENERATING A MODULATED CARRIER SIGNAL

[75] Inventor: Johannes O. Voorman, Eindhoven, Netherlands

[73] Assignee: U.S. Philips Corporation, New York, N.Y.

[21] Appl. No.: 708,561

[22] Filed: May 31, 1991

[30] Foreign Application Priority Data

Jun. 15, 1990 [NL] Netherlands ............... 9001360

[51] Int. Cl.$^6$ ........................... H04L 27/04
[52] U.S. Cl. ............... 375/247; 341/77; 375/252; 375/260
[58] Field of Search ............... 341/77, 143, 155, 341/162; 332/106; 375/27, 28, 30, 33, 247, 252, 260

[56] References Cited

U.S. PATENT DOCUMENTS

| | | | |
|---|---|---|---|
| 4,291,300 | 9/1981 | Bader | 375/28 |
| 4,485,357 | 11/1984 | Voorman | 332/106 |
| 4,507,792 | 3/1985 | Yamakido et al. | 375/30 |
| 4,851,841 | 7/1989 | Sooch | 375/28 |

*Primary Examiner*—Benedict V. Safourek
*Attorney, Agent, or Firm*—Anne E. Barschall

[57] ABSTRACT

An electronic arrangement for generating a modulated carrier signal in a transmitter includes a sigma-delta (one-bit) signal converter and a mixer. The sigma-delta converter includes, in a closed signal loop, an adder, a low pass filter, and a pulse shaper driven with a specific sample rate. The mixer is driven with a carrier frequency fc and has an input coupled with an output of the pulse shaper. The carrier frequency fc is equal to or an integer multiple of the half sample rate.

16 Claims, 3 Drawing Sheets

TRANSMITTER COMPRISING AN ELETRONIC ARRANGEMENT FOR GENERATING A MODULATED CARRIER SIGNAL

The invention relates to a transmitter comprising an electronic arrangement for generating a modulated carrier signal, this arrangement comprising at least an adder included in a closed signal loop, a low-pass filter and a pulse shaper driven with a specific sample rate and constituted by a sigma-delta (one-bit) signal converter.

An electronic arrangement of this type is generally known as a one-bit coder. When a signal having frequencies f of the band around f=0 is applied to the input of the adder of the prior-art arrangement (baseband signal), and the pulse-shaper is driven with frequency fs, the coder output signal comprises, in addition to the baseband signal around f=0, the carrier amplitude modulated baseband signal with frequencies fc=n.fs (n=...−2,−1,+1,+2,...). The frequency spectrum between the amplitude modulated carriers is filled with so-called quantization noise. With the aid of a band-pass filter a desired amplitude modulated carrier having frequency fc can be filtered out and thus, in principle one has the disposal of a one-bit transmitter.

In order to avoid signal leakage, the pulse shaper may be designed such that it generates a one-bit signal consisting of (mutually equal) positive and (mutually equal) negative pulses of a width of 1/(2.fs), separated by blanks (that is to say, intervals in which there is no signal) of the same width.

The prior-art arrangement has an inherent disadvantage. In a practical embodiment the pulses of the one-bit signal have a finite width. As a result, the amplitude-modulated carriers are weakened relative to the baseband signal. When an amplifier output stage for two-level or three-level signals (followed by a band-pass filter) is used, this will lead to a loss of efficiency in the amplifier output stage of the transmitter in which the arrangement is used.

It is an object of the invention to provide a one-bit transmitter which does not present this disadvantage. This object is achieved according to the invention with an arrangement for generating a modulated carrier signal, which arrangement comprises a mixer driven with carrier frequency fc, so that the output signal of the pulse shaper is applied to the mixer and the frequency fc is equal to that or an integer multiple of the half sample rate.

In a one-bit transmitter according to the invention the mixer produces a sum of frequency-shifted spectra so that the amplitude modulated carrier around fc (and −fc) is unattenuated. The baseband signal and all further amplitude modulated signals are now attenuated indeed. With the same power dissipation of the output amplifier stage a larger signal is now fed to the antenna through the band-pass filter. In order to avoid quantization noise being modulated to a frequency band around the carrier frequency fc, according to the invention the carrier frequency fc is selected in such a way that it is equal to or an integer multiple of the half sample rate (fc=n.fs/2, where fs is the sample rate of the pulse shaper, and n=1,2,3,...).

In a preferred embodiment of a transmitter according to the invention the mixer forms part of a closed signal loop and this loop comprises a second mixer driven with carrier frequency fc, so that the output signal of the first mixer is applied to the second mixer. In this preferred embodiment distortion and noise within the baseband are strongly suppressed in the first mixer as this mixer is included in the forward-directing part of the closed signal loop. The modulated signal is demodulated in the feedback part of the closed loop by the second mixer. If the pulses in the one-bit signal are separated by blanks, this signal can be processed in a three-level output stage, followed by a band-pass filter. If the pulses are not separated by blanks, it will be sufficient to use a simpler two-level output stage.

In an exemplary embodiment of an arrangement comprising a second mixer, the closed signal loop also includes a power amplifier (22). With a power amplifier (22) included in the signal loop one has the disposal of a power amplifier wherein, as a result of signal feedback, the signal distortion is strongly reduced.

The requirement that the carrier frequency fc be equal to or an integer multiple of the half sample rate lays heavy demands on the free choice of the carrier frequency fc in the case where a digital input signal and/or a digital low-pass filter in the signal loop is concerned.

In another exemplary embodiment of an arrangement according to the invention, the arrangement comprises a digital-to-analog signal converter (20) or a sample rate converter whose output is connected to an input of the adder. For example, a digital interpolator circuit driven with a certain frequency fs can be used as a sample rate converter. By means of the digital interpolator circuit a digital input signal can be converted into a one-bit signal. If an analog in lieu of a digital low-pass filter is used in the signal loop, it is possible to drive the interpolator circuit before the loop and the pulse shaper within the loop with different sample rates.

In a further exemplary embodiment a transmitter is obtained which comprises an electronic arrangement for generating an exponentially modulated carrier signal. The transmitter comprises at least two parallel combinations for modulating a carrier signal, or a signal shifted in phase by 90° relative to this carrier signal respectively, by means of an in-phase baseband signal or a quadrature baseband signal respectively. In this exemplary embodiment the parallel combinations comprise each a preferred embodiment of an arrangement according to the invention wherein the closed signal loops of the two parallel combinations each contain two mixers and wherein the two mixers in one parallel combination are driven by means of a signal whose frequency fc is equal to the signal by which the two mixers in the other parallel combination are driven and is phase-shifted by 90° relative to that signal. For driving the mixers preferably three-level signals are used, for example, of the type in which the pulses are separated by blanks and have the same width as the pulses.

The output signals of the two parallel combinations are two modulated one-bit signals shifted in phase relative to each other by 90°. The pulses in these signals are separated by blanks. The blanks of one signal coincide with the pulses of the other signal and vice versa so that the signals can be combined to a single two-level signal. The latter signal can then be processed in prior-art manner in a power-efficient switched output amplifier.

With the latter exemplary embodiment one has the disposal in the frequency band around the carrier frequency of an exponential modulator that can be used transparently, for example, for amplitude modulation, vestigial sideband amplitude modulation, single sideband amplitude modulation, frequency modulation or phase modulation. The nature of the modulation is determined by the input signals on the parallel circuits, not by the circuits per se.

A transmitter comprising a two-level exponential modulator according to the invention presents important practical advantages over the prior art three-level exponential modulator disclosed in Dutch Patent Application No. 8101109, which application has the disadvantage that under specific circumstances, for example, in the case where signals occur having a small amplitude, the three-level signal may present very narrow peaks which the known circuit is unable to produce in an undistorted manner. This will thus lead to signal distortion. In addition, a two-level switched output stage can be constructed in a simpler manner than a three-level stage.

In an exemplary embodiment of a transmitter comprising a two-level exponential modulator according to the invention, this transmitter comprises two digital-to-analog signal converters (D/A) (20) or two sample rate converters, the output of one or the other D/A signal converter or the sample rate converter respectively, being connected to an input of the adder in one or the other parallel combination. In an exponential modulator of this type digital input signals can be converted into analog signals or into one-bit signals by means of the sample rate converters.

The invention will be further explained hereinafter with the aid of exemplary embodiments and with reference to the drawing Figures in which.

Figure 1:
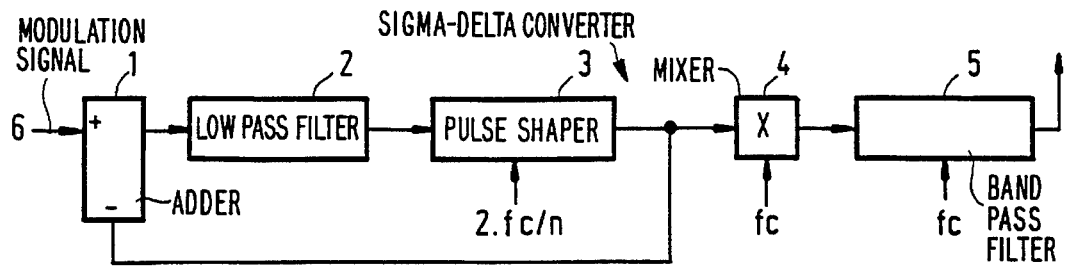
FIG. 1 shows a block diagram of a simple exemplary embodiment for a one-bit transmitter.

FIG. 1 shows a block diagram of a simple exemplary embodiment for a transmitter comprising an arrangement for producing a modulated carrier signal according to the invention, including a sigma-delta (one-bit) signal converter constituted by an adder (1) included in a closed loop, a low-pass filter (2) and a pulse shaper (3) driven with a sample rate 2.fc/n (where fc is the carrier frequency and n a natural number), as well as a (switching) mixer (4) driven with the carrier frequency fc. The arrangement further includes a band-pass filter (5) for frequencies in the band around carrier frequency fc.

A modulation signal (6) is applied to one of the inputs of the adder (1). In the output signal of the pulse shaper (3) the input signal is available as an amplitude modulation on carrier frequencies fc which frequencies are an integer multiple of the sample rate of the pulse shaper (3). The spectrum of the output signal of the mixer (4) is a sum of frequency-shifted spectra of the output signal of the pulse shaper so that the modulated carrier with frequency fc has a maximum value. In order to avoid that the latter output signal also contains quantization noise modulated in the band around fc, the carrier frequency fc is to be equal to or an integer multiple of the half sample rate of the pulse shaper (3). The output signal of the mixer (4), a one-bit signal, is fed to an output amplifier comprising an (antenna) band-pass filter (5).

Figure 2:
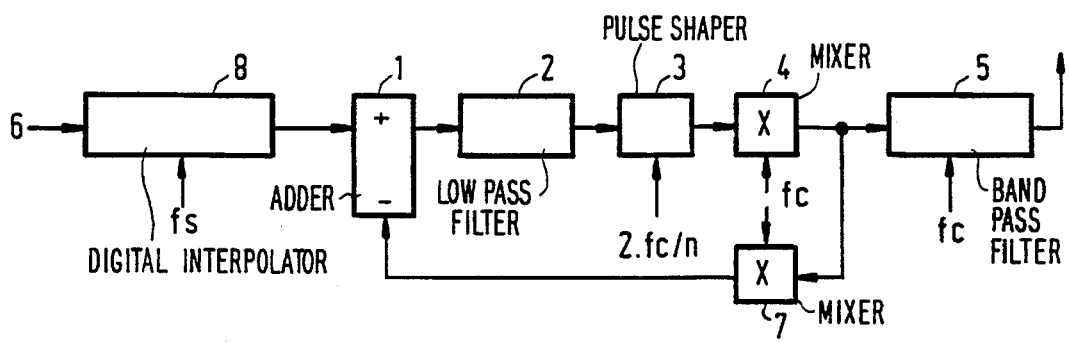
FIG. 2 shows a block diagram of a one-bit transmitter comprising a second mixer in a closed signal loop, and including a digital interpolator circuit.

FIG. 2 shows a block diagram of a transmitter again comprising an adder (1), a low-pass filter (2), a pulse shaper (3), a (switching) mixer (4) and a band-pass filter (5). Different from that discussed with respect to FIG. 1 the mixer (4) is now included in the closed signal loop and this loop further comprises a second (switching) mixer (7). Distortions and noise within the baseband are strongly suppressed by the first mixer (4) as it is included in the forward-directing pan of the closed signal loop. The second mixer (7) in the closed loop provides demodulation of the feedback signal modulated by the first mixer (4). The band-pass filter (5) is a filter for analog signals; the passband may be chosen to be relatively wide when provisions are made that the frequency spectrum alongside the important frequency bands is relatively clean (shows little quantization noise). Such provisions may be made in a manner known per se at the cost of a low sample rate for the pulse shaper (3).

FIG. 2 further shows a digital interpolator circuit (8) operating as a sample rate converter. With this interpolator circuit an input signal (6) which is digital can be converted into a one-bit signal. If, furthermore, not a digital but an analog filter is used as a low-pass filter (2), different sample rates can be used for the interpolator circuit (8) and the pulse shaper (3), which in principle does not pose further restrictions concerning the choice of the carrier frequency fc which is related to the sample rate of the pulse shaper.

Figure 3:
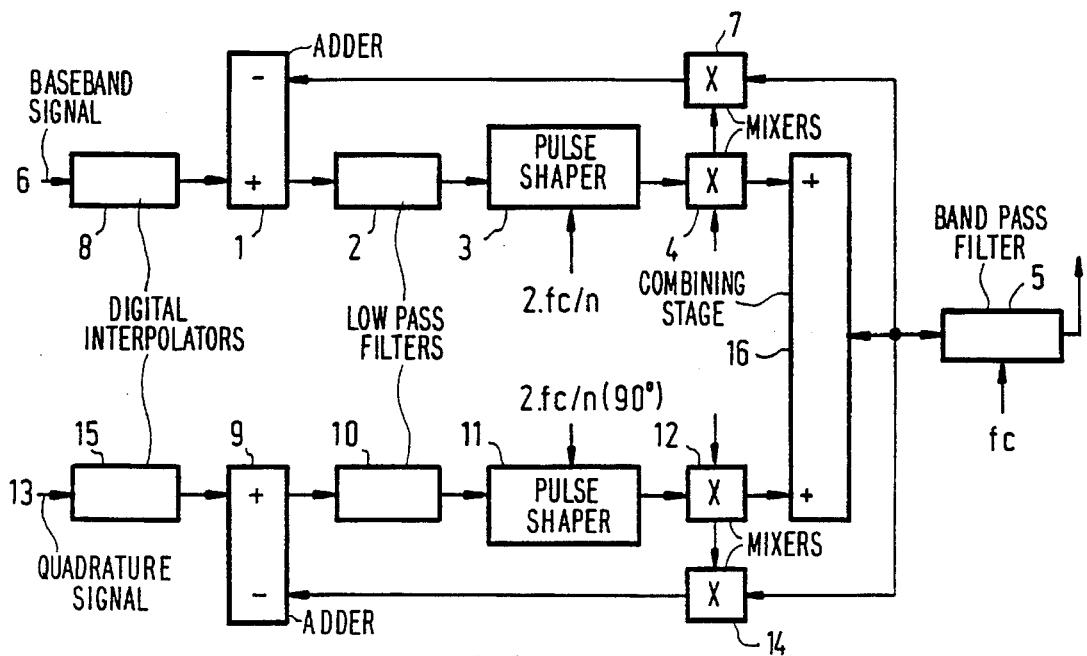
FIG. 3 shows a one-bit transmitter for exponential modulation comprising two interpolator circuits.
Figure 4:
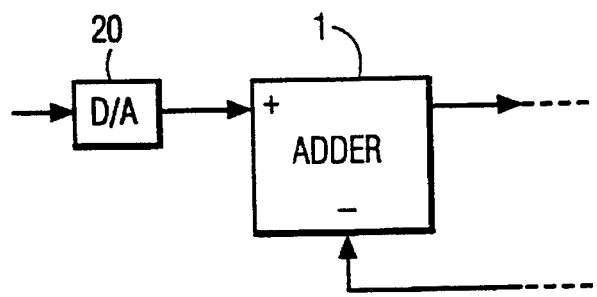
FIG. 4 shows a portion of the transmitter with a D/A converter at the input of the adder.
Figure 5:
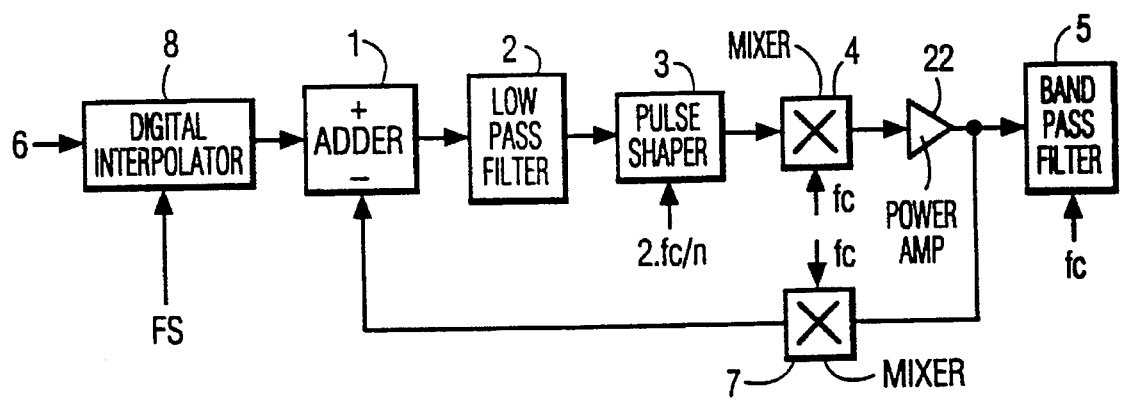
FIG. 5 shows the transmitter of FIG. 2 with a power amplifier in the feedback loop.
Figure 6:
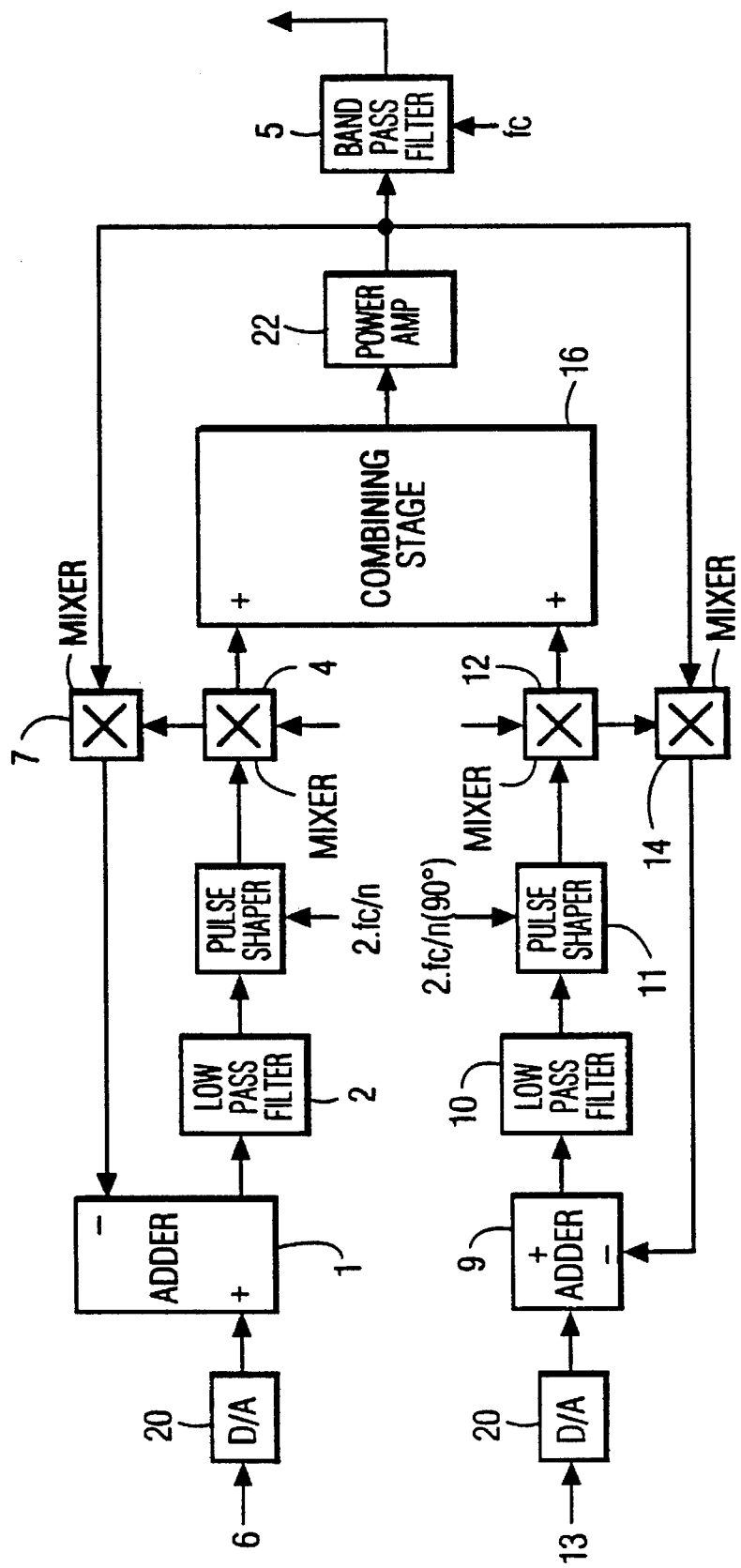
FIG. 6 shows the transmitter of FIG. 3 with a power amplifier in the feedback loop.

FIG. 3 shows a block diagram of a one-bit transmitter for exponential modulation, comprising two interpolator circuits (8, 15 respectively). The transmitter comprises two parallel combinations which include each a closed signal loop with an adder (1, 9, respectively), a low-pass filter (2, 10, respectively), a pulse shaper (3, 11 respectively) and two mixers (4 and 7; 12 and 14 respectively), as well as a combining stage (16) and a band-pass filter (5).

In this transmitter the (digital) baseband signal (6) and its quadrature signal (13) are applied to the interpolator circuits (8, 13 respectively), after which the modulation signals thus converted to one-bit signals are applied to the adders (1, 9 respectively) of the two parallel combinations. The two mixers (4, 7) in one parallel combination are driven by means of a signal whose frequency fc is equal to the signal driving the two mixers (12, 14) in the other parallel combination and whose phase is shifted by 90° relative to that signal. If in the two parallel combinations the pulse shapers are designed in such a way that they generate one-bit signals formed by (mutually equal) positive and (mutually equal) negative pulses having a specific width, separated by blanks of the same width, the two parallel combinations will produce a modulated signal with a carrier frequency fc, while each time the modulated signal from one parallel combination carries information (i.e. is not equal to zero) the signal from the other parallel combination is zero, and vice versa. These two modulated one-bit signals (with blanks) phase shifted by 90° are combined in the combining stage 16 in a two-level signal which is then fed to the band-pass filter (5). By means of interpolator circuits (8, 15 respectively) digital input signals can be converted into one-bit signals to be applied to the adder (1, 9 respectively) in each one of the two parallel combinations.

I claim:

1. An electronic arrangement for generating a modulated carrier signal in a transmitter, the arrangement comprising
   a) a sigma-delta (one-bit) signal converter including, in the forward feeding path of a closed signal loop, the following components in cascade in the following order
      i) an adder, at an the input of the loop,
      ii) a lowpass filter, and
      iii) a pulse shaper driven with a specific sample rate, and
   b) a first mixer driven with a carrier frequency fc and having an input coupled with an output of the pulse shaper, the carrier frequency fc being equal to or an integer multiple of half the specific sample rate.

2. Arrangement as claimed in claim 1, characterized in that the mixer forms part of the closed signal loop and a feedback path of this loop comprises a second mixer driven with the carrier frequency fc, the second mixer receiving a signal derived from an output signal of the first mixer.

3. Arrangement as claimed in claim 2, characterized in that the closed signal loop comprises a power amplifier at an output of the first mixer.

4. Arrangement as claimed in claim 3, characterized in that the arrangement comprises a digital-to-analog signal converter having an input and an output, the output of said digital-to-analog signal converter being connected to an input of the adder and the input of said digital-to-analog signal converter being coupled to receive a modulation signal.

5. Arrangement as claimed in claim 3, characterized in that the arrangement comprises a sample rate converter having an input and an output, the output of said sample rate converter being connected to an input of the adder and the input of said sample rate converter being coupled to receive a modulation signal.

6. Arrangement as claimed in claim 2, characterized in that the arrangement comprises a digital-to-analog signal converter having an input and an output, the output of said digital-to-analog signal converter being connected to an input of the adder and the input of said digital-to-analog signal converter being coupled to receive a modulation signal.

7. Arrangement as claimed in claim 2, characterized in that the arrangement comprises a sample rate converter having an input and an output, the output of said sample rate converter being connected to an input of the adder and the input of said sample rate converter being coupled to receive a modulation signal.

8. The arrangement of claim 2 wherein an output of the second mixer is coupled with a second input of the adder.

9. Arrangement as claimed in claim 1, characterized in that the arrangement comprises
   a digital-to-analog signal converter having an output connected to an input of the adder and an input coupled to receive a modulation signal.

10. Arrangement as claimed in claim 1, characterized in that the arrangement comprises
    a sample rate converter having an output connected to an input of the adder and having an input coupled to receive a modulation signal.

11. The arrangement of claim 1, wherein the first mixer is outside the closed signal loop.

12. The arrangement of claim 1 wherein an output of the pulse shaper is fed back to a second input of the adder.

13. An electronic arrangement for generating a modulated carrier signal in a transmitter, the arrangement comprising first and second sigma-delta (one-bit) signal converters, arranged in parallel, each converter including,
   a) in a closed signal loop,
      i) in a feed forward path, in cascade in the following order,
         A) an adder, at an input of the feed forward path,
         B) a low pass filter,
         C) a pulse shaper driven with a specific sample rate, and
         D) a first mixer, in the forward path, driven with a respective carrier frequency and having an input coupled with an output of the pulse shaper, the respective carrier frequency being equal to or an integer multiple of half the specific sample rate, and
      ii) a second mixer, in a feedback path, driven with the respective carrier frequency and having an input coupled with an output of the first mixer,
   b) a first input for receiving the respective carrier frequency for the first converter,
   c) a second input for receiving the respective carrier frequency for the second converter, the respective carrier of the second converter being phase shifted by 90° with respect to the respective carrier of the first converter,
   d) the first converter receiving and modulating a baseband signal with the respective carrier of the first converter, and quadrature signal with the respective carrier of the second converter.

14. The arrangement of claim 13 further comprising a first digital-to-analog converter coupling the baseband signal to the first converter and a second digital-to-analog converter coupling the quadrature signal to the second converter.

15. The arrangement of claim 13 further comprising a first sample rate converter coupling the baseband signal to the first converter and a second sample rate converter coupling the quadrature signal to the second converter.

16. The arrangement of claim 13 further comprising
    a combining circuit coupled to combine outputs of the first mixer in the first converter and the first mixer in the second converter; and
    means for coupling the an output of the combining circuit with inputs of the second mixer in the first converter and the second mixer in the second converter.

* * * * *